(12) United States Patent
Nagano et al.

(10) Patent No.: US 7,507,779 B2
(45) Date of Patent: Mar. 24, 2009

(54) PAINT COMPOSITIONS

(75) Inventors: Toshiaki Nagano, Yokohama (JP);
Terutaka Takahashi, Hiratsuka (JP);
Hideo Sugai, Hiratsuka (JP)

(73) Assignee: Kansai Paint Co., Ltd., Amagasaki-Shi (JP)

(*) Notice: Subject to any disclaimer, the term of this patent is extended or adjusted under 35 U.S.C. 154(b) by 0 days.

(21) Appl. No.: 11/218,510

(22) Filed: Sep. 6, 2005

(65) Prior Publication Data

US 2006/0052493 A1    Mar. 9, 2006

(30) Foreign Application Priority Data

Sep. 3, 2004    (JP) .............................. 2004-256981

(51) Int. Cl.
*C08L 23/00* (2006.01)
*C08L 75/04* (2006.01)
*C08L 26/26* (2006.01)

(52) U.S. Cl. .................. 525/455; 525/454; 525/453; 525/452; 525/416; 525/185; 524/236; 524/99; 524/106; 524/154

(58) Field of Classification Search ................ 524/570, 524/95, 96, 99, 100, 104, 106, 105, 111, 524/236, 154; 525/570, 452, 416, 455, 454, 525/185, 123
See application file for complete search history.

(56) References Cited

U.S. PATENT DOCUMENTS

| 3,932,320 | A | * | 1/1976 | Camelon et al. ............. 523/205 |
| 4,391,857 | A |   | 7/1983 | Saito et al. ................ 427/385.5 |
| 4,657,958 | A | * | 4/1987 | Fieldhouse et al. .......... 524/247 |
| 4,792,357 | A |   | 12/1988 | Bier ............................ 106/83 |
| 4,874,548 | A | * | 10/1989 | Hajovsky ..................... 252/511 |
| 5,096,761 | A |   | 3/1992 | Roberts et al. ................ 428/77 |
| 5,425,969 | A |   | 6/1995 | Wakabayashi et al. ...... 427/470 |
| 5,705,098 | A |   | 1/1998 | Okuda et al. ................. 252/518 |
| 6,048,388 | A | * | 4/2000 | Schwarz ................... 106/31.27 |
| 6,228,456 | B1 | * | 5/2001 | Butterbach et al. ......... 428/64.1 |
| 6,699,932 | B2 | * | 3/2004 | Urata et al. .................... 525/64 |
| 7,235,610 | B2 | * | 6/2007 | Fujino et al. ............. 525/334.1 |
| 2003/0069440 | A1 | * | 4/2003 | Guo et al. .................... 560/224 |
| 2003/0212191 | A1 | * | 11/2003 | Nakaoka et al. ............. 524/501 |
| 2004/0054041 | A1 | * | 3/2004 | Schmidt ....................... 524/99 |
| 2005/0183628 | A1 | * | 8/2005 | Lehmann et al. ......... 106/31.13 |
| 2006/0100323 | A1 | * | 5/2006 | Schmidt et al. ............. 524/106 |

FOREIGN PATENT DOCUMENTS

| EP | 0576031 | 12/1993 |
| GB | 2359555 | 8/2001 |
| JP | 58017174 | 2/1983 |
| JP | 3-149271 | 6/1991 |
| JP | 3-275780 | 12/1991 |
| JP | 6-165966 | 6/1994 |
| JP | 7-228798 | 8/1995 |
| JP | 8-295830 | 11/1996 |
| JP | 9-12314 | 1/1997 |
| JP | 10-53417 | 2/1998 |
| JP | 2002-53797 | 2/2002 |
| JP | 2003-231767 | 8/2003 |
| JP | 2004-217872 | 8/2004 |
| WO | WO 03/074606 A1 * | 9/2003 |

* cited by examiner

*Primary Examiner*—Vasu Jagannathan
*Assistant Examiner*—Rip A. Lee
(74) *Attorney, Agent, or Firm*—Wenderoth, Lind & Ponack, L.L.P.

(57) ABSTRACT

This invention discloses paint compositions characterized by comprising polyolefin or modified polyolefin (A) and ionic liquid (B), and coating methods using the compositions.

13 Claims, No Drawings

PAINT COMPOSITIONS

TECHNICAL FIELD

This invention relates to paint compositions which are capable of forming coating films having sufficient electric conductivity without using electrically conducting pigment.

BACKGROUND ART

Plastic Materials used for car parts such as bumpers normally have volume specific resistivity not lower than about $10^{10}$ Ω·cm, and it is difficult to directly apply paint onto such plastic shaped articles by means of electrostatic coating excelling in transfer efficiency. For this reason, conventionally an electrically conducting primer is applied onto such a material surface first, and thereafter top coat for coloring is applied by electrostatic coating (e.g., see JP Hei 6 (1994)-165966A).

Furthermore the plastic materials used for, e.g., car bumpers or the like normally have deep colors such as black. When light colored top coat or that of low hiding power is to be applied, said electrically conducting primer is required to have high hiding power or color of high value. With the view to meet such a requirement, various conducting paints using conducting pigments of relatively high value (antimony-doped type or non-antimony type pigments) have heretofore been proposed (e.g., JP Hei 9 (1997)-12314A, JP Hei 10(1998)-53417A). Whereas, antimony-doped type conducting pigments pose toxicity problem, and non-antimony type conducting pigments are very expensive.

JP 2003-231767A proposed use of conducting primer formed by adding cheap conducting carbon black pigment and specific aluminum powder as electrically conducting filler. This allowed formation of light grey primer coating and which has enabled electrostatic coating of light color top coat. However, where a formation of, in particular, a pearly multi-layered coating film of high degree of whiteness, i.e, having an L-value of whiteness on CIE color matching function of not less than 90, is intended, said conducting primer remains unsatisfactory. For conducting primer for which such high degree of whiteness is required, expensive white conducting pigment must be used.

DISCLOSURE OF THE INVENTION

A main object of the present invention is to provide paint compositions which can form conducting primer coating film having high value color, high hiding power and sufficient electric conductivity, without using expensive white conducting pigment but only by blending ordinary white pigment.

We have engaged in concentrative studies to now find that the above object can be accomplished by the use of polyolefin or modified polyolefin and an ionic liquid as at least a part of the film-forming component of the paint, and completed the present invention.

Thus, according to the present invention, paint compositions which are characterized by containing (A) polyolefin or modified polyolefin and (B) an ionic liquid are provided.

The invention also provides coating processes which are characterized by applying above paint compositions.

The paint compositions according to the present invention are capable of forming coating films having sufficient electric conductivity without using electrically conducting pigment, and can be conveniently used, in particular, for coating plastic shaped articles. Moreover, the paint compositions of the invention are useful as electrically conducting primers when they contain white pigment, to form high value, high hiding power primer coating film and in consequence make it possible to easily form multi-layered coating film having high value or high chroma painted color.

Hereinafter the present invention is explained in further details.

Polyolefin and Modified Polyolefin (A):

Polyolefin useful for the paint compositions of the present invention includes polyolefin formed by (co)polymerizing one or more than one of $C_2$-$C_{10}$ olefins such as, for example, ethylene, propylene, butylene, hexene and the like. Also said modified polyolefin includes unsaturated carboxylic acid- or acid anhydride-modified products, acryl modified products and chlorinated products of above polyolefins, and modified polyolefins obtained by combining these modification means.

As such polyolefin useful for the paint compositions of the present invention, those containing propylene as a polymerization unit are particularly advantageous. The weight ratio occupied by propylene unit in the polyolefin or modified polyolefin (A) lies within a range of generally at least 0.5, in particular, 0.6-1, inter alia, 0.7-0.95, from the standpoints of its compatibility with other component(s) and adherability of formed coating film.

As the polyolefin, those per se known can be used without any particular limitation, while from the viewpoints of narrow molecular weight distribution and excellent random copolymerizability of resulting polyolefin, those produced by (co)polymerizing olefins using a single site catalyst as the polymerization catalyst are preferred. Single site catalyst refers to such a polymerization catalyst having a uniform (single site) active spot structure. Of single site catalysts, metallocene catalysts are particularly preferred. Metallocene catalysts can be prepared by combining metallocene (bis(cyclopentadienyl) metal complexes and derivatives thereof) which are compounds of transition metals of Groups IV-VI of the periodic table or of rare earth transition metals of Group III of the periodic table, having at least one conjugated 5-membered ring ligand; promoters derived from aluminoxane or boron, which activate the metallocene; and further organoaluminum compound such as trimethylaluminum. (Co)polymerization of an olefin or olefins can be conducted by the means known per se, for example, by supplying olefin or olefins such as propylene, ethylene and the like to a reaction vessel concurrently with hydrogen, while continuously adding alkylaluminum and metallocene thereto.

Unsaturated carboxylic acid- or acid anhydride-modified polyolefin can be prepared by, for example, graft polymerizing to polyolefin an unsaturated carboxylic acid or anhydride thereof, by a means known per se. The unsaturated carboxylic acid or anhydride thereof useful for the modification include $C_3$-$C_{10}$ aliphatic carboxylic acids having at least one, preferably only one, polymerizable double bond per molecule. As specific examples, (meth)acrylic acid, maleic acid, fumaric acid, itaconic acid, maleic anhydride and the like can be named. Of these, maleic acid and anhydride thereof are particularly preferred. The amount of such a graft-polymerized unsaturated carboxylic acid or anhydride thereof is variable in accordance with physical properties desired for the modified polyolefin. In general terms, however, it is suitably within a range of, based on the solid weight of the polyolefin, 1-20 wt %, in particular, 1.5-15 wt %, inter alia, 2-10 wt %.

Acryl modified polyolefin can be prepared by graft-polymerizing at least one acrylic unsaturated monomer to polyolefin by suitable means known per se. As acrylic unsaturated monomers useful for this acryl modification, for example, $C_1$-$C_{20}$ alkyl esters of (meth)acryl acid such as methyl (meth)

acrylate, ethyl (meth)acrylate, propyl (meth)acrylate, butyl (meth)acrylate, hexyl (meth)acrylate, cyclohexyl (meth)acrylate, 2-ethylhexyl (meth)acrylate, lauryl (meth)acrylate, stearyl (meth)acrylate and the like; $C_1$-$C_{21}$ hydroxyalkyl esters of (meth)acrylic acid such as 2-hydroxyethyl (meth)acrylate, 3-hydroxypropyl (meth)acrylate and the like; other (meth)acrylic monomers such as (meth)acrylic acid, glycidyl (meth)acrylate, (meth)acrylamide, (meth)acrylonitrile and the like; and furthermore, styrene and the like can be named. These may be used either singly or in combination of two or more.

In the present specification, "(meth)acryl" means "acryl or methacryl", and "(meth)acrylate" means "acrylate or methacrylate".

Acryl modification of polyolefin can be conducted by, for example, introducing into polyolefin polymerizable unsaturated group or groups by reacting with an unsaturated carboxylic acid- or acid anhydride-modified polyolefin which is prepared as above, an acrylic unsaturated monomer such as glycidyl (meth)acrylate, which is reactive with the carboxyl group in said modified polyolefin; and (co)-polymerizing the polymerizable unsaturated group with above acrylic unsaturated monomer, either alone or in combination of two kinds or more. The use rate of the acrylic unsaturated monomer in the acryl modification of polyolefin is variable depending on physical properties desired for the modified polyolefin, but it is generally desirable to use it within a range of, based on the solid weight of the resultant modified polyolefin, not more than 30 wt %, in particular, 0.1-20 wt %, inter alia, 0.15-15 wt %, from the standpoint of compatibility with other component(s) and adherability of formed coating film.

Chlorinated product of polyolefin can be prepared by chlorinating polyolefin. Chlorination of polyolefin can be conducted, for example, by blowing chlorine gas into an organic solvent solution or dispersion of the polyolefin or a modified product thereof, at reaction temperatures ranging 50-120° C. The chlorine content in the chlorinated polyolefin (solid component) is variable depending on physical properties desired for the particular chlorinated polyolefin, while it is generally desirable to make it within a range of, based on the weight of the chlorinated polyolefin, not more than 35 wt %, in particular, 10-30 wt %, inter alia, 12-25 wt %, from the standpoint of adherability of formed coating film.

It is normally desirable for the polyolefin or modified polyolefin (A) which is used in the present invention to have melting point within a range of not higher than 120° C., preferably 30-110° C., inter alia, 50-100° C.; and a weight-average molecular weight ($M_w$) within a range of 50,000-150,000, preferably 60,000-135,000, inter alia, 70,000-120,000, from the standpoints of compatibility with other component(s), adherability of formed coating film to polyolefin substrate, inter-layer adherability to top coat layer and the like. It is also generally desirable for the polyolefin or modified polyolefin (A) to have a calorie of fusion within a range of 1-50 mJ/mg, in particular, 2-50 mJ/mg, from the standpoint of adherability of the formed coating film to substrate and inter-layer adherability to the top coat layer.

Here the melting point and calorie of fusion of the polyolefin or modified polyolefin are those measured with a differential scanning calorimeter, DSC-5200™ (Seiko Instruments, Inc.), using 20 mg of a sample polyolefin or modified polyolefin, by measuring the calorimetric consumption at a temperature rise rate of 10° C./min. Melting point of the polyolefin or modified polyolefin can be adjusted by varying the monomeric composition of the polyolefin, in particular, that of the α-olefin monomer used. When calorie of fusion is difficult to determine, a sample for the measurement can be heated to 120° C. once, cooled to room temperature at a cooling rate of 10° C./min and then the calorie can be measured by the above-described means.

The given weight-average molecular weight of the polyolefin or modified polyolefin is the value obtained by converting a weight-average molecular weight measured by gel permeation chromatography, using weight-average molecular weight of polystyrene as the standard. As the gel permeation chromatography column, "HLC/GPC 150C" (Water Co., 60 cm×1) was used, and as the solvent, o-dichlorobenzene was used: column temperature was 135° C., and the flow rate was 1.0 ml/min. Each sample to be fed into the column was prepared by dissolving a polyolefin in o-dichlorobenzene to a concentration of 5 mg of the polyolefin in 3.4 ml of said solvent, at 140° C. for 1-3 hours. As the column for the gel permeation chromatography, "GMH$_{HR}$-H(S)HT™ (TOSOH Corporation) can be used. Number-average molecular weight can also be determined in the similar manner.

Furthermore, it is generally desirable for the polyolefin or modified polyolefin (A) which are used in the present invention to have a ratio of weight-average molecular weight to number-average molecular weight ($M_w/M_n$) within a range of 1.5-7.0, preferably 1.8-5.0, inter alia, 2.0-4.0, from the standpoint of compatibility with other component(s) and adherability of formed coating film.

The polyolefin or modified polyolefin (A) may be used as diluted with an organic solvent or as an aqueous dispersion.

As the organic solvent for diluting the polyolefin or modified polyolefin (A), for example, aromatic hydrocarbon solvents such as toluene, xylene, benzene and the like; alicyclic hydrocarbon solvents such as cyclopentane, methylcyclopentane, cyclohexane, methylcyclohexane, ethylcyclohexane, cyclooctane, cyclononane and the like; ester solvents such as ethyl acetate, butyl acetate and the like; ester solvents such as ethyl acetate, butyl acetate and the like; ketone solvents such as methyl ethyl ketone, methyl isobutyl ketone and the like; and alcoholic solvents such as ethanol, isopropanol, n-butanol and the like can be named. These can be used either singly or in combination of two or more.

Dispersion of the polyolefin or modified polyolefin (A) in water can be conducted normally using unsaturated carboxylic acid- or acid anhydride-modified polyolefin as the starting material, by neutralizing a part or whole of carboxyl groups in such starting material with amine compound and/or dispersing in water with an emulsifying agent. For improving dispersibility in water, it is desirable to concurrently use both means of the neutralization and dispersing in water with emulsifying agent.

As amine compound used for the neutralization, for example, tertiary amines such as triethylamine, tributylamine, dimethylethanolamine, triethanolamine and the like; secondary amines such as diethylamine, dibutylamine, diethanolamine, morpholine and the like; and primary amines such as propylamine, ethanolamine and the like can be named.

When the amine compound is used, its normally preferable use rate lies within a range of 0.1-1.0 mole equivalent to carboxyl groups in the unsaturated carboxylic acid- or acid anhydride-modified polyolefin.

As the emulsifying agent, for example, nonionic emulsifiers such as polyoxyethylene monooleyl ether, polyoxyethylene monostearyl ether, polyoxyethylene monolauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monosterate, polyoxyethylene monooleate, sorbitan monolaurate, sorbitan monostearate, sorbitan trioleate polyoxyethylene sorbitan monolaurate and the like; and anionic emulsifiers such as sodium salts or ammonium salts of alkylsulfonic acids, alkylbenzenesulfonic acids, alkylphosphoric acids and the like can be named. Polyoxyalkylene-containing anionic emulsifiers containing an anionic group and a polyoxyalkylene group such as polyoxyethylene or polyoxypropylene or the like per molecule; or reactive anionic emulsifiers containing an anionic group and a polymerizable unsaturated group per molecule may also be used. These emulsifiers can be used either singly or in combination of two or more.

Such emulsifier is normally used within a range of 1-20 parts by weight, per 100 parts by weight of solid component of unsaturated carboxylic acid- or acid anhydride-modified polyolefin.

Where necessary, thus obtained aqueous dispersion of unsaturated carboxylic acid- or acid anhydride-modified polyolefin can be made an aqueous dispersion of further acryl-modified, unsaturated carboxylic acid- or acid anhydride-modified polyolefin, through emulsion polymerization with acrylic unsaturated monomer or monomers as enumerated in the explanation of acryl modification, in the presence of the unsaturated carboxylic acid- or acid anhydride-modified polyolefin which is dispersed in water.

Ionic Liquid (B):

The ionic liquid (B) useful for the paint compositions of the present invention includes molten salts (fused salts) which are liquid at room temperature. Ordinary salts are generally solid at ambient temperature, but molten salts are formed by ionic bonding of specific cation(s) with anion(s) and they are liquid at room temperature. Here "room temperature" refers to about 20° C., and a temperature range of from about 10° C. to about 40° C. is referred to as "room temperature range".

Such ionic liquid (B) comprises ionic bond of one, two or more cations with one, two or more anions in various combinations. As the cation, those having at least one onium salt structure selected from ammonium salts, phosphonium salts and sulfonium salts are particularly preferred.

As the ionic liquid (B), for example, those comprising combination of a cation such as, for example, a quaternary ammonium cation of nitrogen-containing heterocyclic structure, e.g., imidazolium having alkyl chain, pyridinium, pyrrolidinium, pyrazolidinium, isothiazolidinium, isoxazolidinium and the like; or an aliphatic cation such as ammonium cation, phosphonium cation, sulfonium cation or the like; with anion derived from tetrafluoroboric acid, hexafluorophosphoric acid, tris(trifluoromethylsulfonyl)nitric acid, tris (trifluoromethylsulfonyl)carbonic acid, trifluoromethylsulfonylimide, organic carboxylic acid, halogen or the like, can be named. As the organic carboxylic acid herein referred to, lactic acid can be named for example, and halogen includes fluorine, chlorine, bromine and iodine.

As specific examples of the ionic liquid (B), 1,2-dimethylimidazolium tetrafluoroborate, tetrabutylammonium bromide, hexadecyltributylphosphonium bromide, 1-butyl-3-methylimidazolium hexafluorophosphate, N-hexylpyridinium tetrafluoroborate, 1-ethyl-3-methylimidazolium tetrafluoroborate, 1-hexyl-3-methyl- imidazolium tetrafluoroborate, 1-ethyl-3-methylimidazolium bis(trifluoromethylsulfonyl)imide, 1-butyl-3-methylimidazolium bis (trifluoromethylsulfonyl)imide, 1-ethyl-3-methylimidazolium triflate, 1-ethyl-3-methylimidazolium chloride, N-butylpyridinium chloride, N,N-diethyl-N-methyl-(2-methoxyethyl)ammonium tetrafluoroborate, N,N-diethyl-N-methyl-(2-methoxyethyl)ammonium bis(trifluoromethylsulfonyl)imide, 1-ethyl-3-methylimidazolium-(L)-lactate, 1-butyl-3-methylimidazolium-(L)-lactate and the like can be named.

While it is normally desirable to use colorless, transparent ionic liquid (B), colored ones may be used within a range not affecting the color of coating film formed. There are various kinds of ionic liquid (B) which are water-soluble, difficulty water-soluble or water-insoluble, and it is desirable to select proper ionic liquid (B) case by case, according to individual forms of paint compositions of the present invention.

Blend ratio of ionic liquid (B) in paint compositons of the present invention is variable depending on intended utility or form of use of the composition in each case. Whereas, from the viewpoint of electric conductivity, adherability and water resistance, it can generally be 0.5-30 wt %, preferably 0.75-20 wt %, inter alia, 1-10 wt %, based on the weight of non-volatile component of each paint composition.

Paint Compositions:

Paint compositions of the present invention may be either organic solvent-based or water-based, so long as they contain, as at least a part of their film-forming component, above-described polyolefin or modified polyolefin (A) and ionic liquid (B). The paint compositions of the invention may further contain, where necessary, hydroxyl-containing resin (C) having a hydroxyl value within a range of 5-200 mgKOH/g.

The hydroxyl-containing resin(C) includes resins having on the average at least two hydroxyl groups per molecule. As examples of useful kinds, acrylic resin, polyester resin, polyurethane resin, graft products of those resins, acryl-modified or polyester-modified epoxy resin, and self-crosslinkage type resins such as blocked isocyanate-containing polyester resin and the like can be named. In particular, acrylic resin and polyester resin are convenient. The hydroxyl-containing resin (C) can be made any type such as organic solvent diluted, non-water dispersed, water-soluble or water-dispersed, depending on the form of individual paint compositon.

From the viewpoint of compatibility with other components and hardenability of formed coating film, it is desirable for the hydroxyl-containing resin (C) to have a hydroxyl value generally in the range of 5-150 mgKOH/g, in particular, 10-100 mgKOH/g.

Blend ratio of the hydroxyl-containing resin (C) is variable depending on the form of individual paint composition. From the viewpoint of adherability and water resistance of the coating film formed therefrom, generally it can be within a range of, in terms of weight ratio of solid components, i.e., polyolefin or modified polyolefin (A)/hydroxyl-containing resin (C), 10/90-100/0, preferably 20/80-85/15, inter alia, 25/75-60/40.

Where a paint composition according to the present invention is water-based, it can further contain as a vehicle component a urethane dispersion. Said "urethane dispersion" is a dispersion obtained through the steps of preparing in advance a urethane prepolymer by reacting diol with diisocyanate and, where necessary, dimethylolalkanoic acid or the like, normally in the presence of an emulsifier, and subjecting the prepolymer to forced emulsification or self-emulsification while dispersing it in water. From the viewpoint lo of improved physical properties of coating film formed from the paint composition, it is desirable to blend the urethane dispersion generally at a ratio not higher than 65 wt %, in particular, in the range of 5-50 wt %, inter alia, 10-40 wt %, based on the combined solid contents of polyolefin or modified polyolefin (A), hydroxyl-containing resin (C) and crosslinking agent (D) which is described later.

The paint compositions of the present invention may further contain, where necessary, a crosslinking agent (D). As said crosslinking agent (D), normally amino resin and/or blocked polyisocyanate which are capable of reacting with hydroxyl groups in the hydroxyl-containing resin (C). Where the paint composition contains modified polyolefin having carboxyl groups, an epoxy compound reactable with the carboxyl groups may be used as the crosslinking agent (D).

As the amino resin, for example, melamine resin, urea resin, benzoguanamine resin and the like may be named. Of these, melamine resin is preferred, and as melamine resin, alkyletherified melamine resins which are etherified with such alkyl groups as methyl, ethyl, n-butyl, isobutyl, hexyl, 2-ethylhexyl and the like are particularly preferred, which may be either hydrophobic or hydrophilic. These melamine resins may further have methylol, imino or the like groups. It is normally desirable for the amino resin to have a number-average molecular weight within a range of 500-5,000, in particular, 800-3,000. Such number-average molecular weight of an amino resin is the value determined by converting its weight-average molecular weight measured by gel permeation chromatography using tetrahydrofuran as the solvent at a flow rate of 1.0 ml/min., based on weight-average molecular weight of polystyrene. As the gel permeation chromatography device, "HLC8120GPC" (TOSOH Corporation) can be used, and as the column, "TSKgel G-4000 H×L", "TSKgel G-3000 H×L", "TSKgel G-2500 H×L", "TSKgel G-2000 H×L" (products of Tosoh Corporation) and the like can be used.

The blocked polyisocyanate is a polyisocyanate compound having at least two free isocyanate groups per molecule, whose isocyanate groups are blocked with a blocking agent.

As such polyisocyanate compound, for example, aliphatic polyisocyanates such as hexamethylene diisocyanate, trimethylhexamethylene diisocyanate, dimeric acid diisocyanate, lysine diisocyanate and the like; biuret type adducts or isocyanurate ring adducts of those aliphatic polyisocyanates; alicyclic diisocyanates such as isophorone diisocyanate, 4,4'-methylenebis(cyclohexyl isocyanate),methylcyclohexane-2, 4- or -2,6-diisocyanate, 1,3- or 1,4-di(isocyanatomethyl)cyclohexane, 1,4-cyclohexane diisocyanate, 1,3-cyclopentane diisocyanate, 1,2-cyclohexane diisocyanate and the like; biuret type adducts or isocyanurate ring adducts of these alicyclic diisocyanates; aromatic diisocyanate compounds such as xylylene diisocyanate, tetramethylxylylene diisocyanate, tolylene diisocyanate, 4,4'-diphenylmethane diisocyanate (MDI), 1.5-naphthalene diisocyanate, 1,4-naphthalene diisocyanate, 4,4'-toluydine diisocyanate, 4,4'-diphenylether diisocyanate, (m- or p-) phenylene diisocyanate, 4,4'-biphenylene diisocyanate, 3,3'-dimethyl -4,4'-biphenylene diisocyanate, bis(4-isocyanatophenyl)sulfone, isopropylidenebis(4-phenyl isocyanate) and the like; biuret type adducts or isocyanurate ring adducts of these aromatic diisocyanates; hydrogenated MDI and derivatives thereof, polyisonates having at least three isocyanate groups per molecule, such as triphenylmethane-4,4',4"-triisocyanate, 1,3,5-triisocyanatobenzene, 2,4,6-triisocyanatotoluene, 4,4'-dimethyldiphenylmethane-2,2',5,5'-tetraisocyanate and the like; biuret type adducts or isocyanurate ring adducts of these polyisocyanates; urethanated adducts formed by reacting hydroxyl groups in a polyol such as ethylene glycol, propylene glycol, 1,4-butylene glycol, dimethylolpropionic acid, polyalkylene glycol, trimethylolpropane, hexanetriol or the like with a polyisocyanate compound at a ratio such that isocyanate groups are present in excess; and biuret type adducts or isocyanurate ring adducts of these urethanated adducts can be named.

Blocked polyisocyanates are those polyisocyanate compounds as named above, whose isocyanate groups are blocked by addition of blocking agent. The blocked polyisocyanate compounds formed by the addition are desirably such that they are stable at ambient temperature but dissociate the blocking agent when heated to baking temperature (normally about 100-about 200° C.) to release free isocyanate groups. Examples of blocking agent meeting such a requirement include phenols such as phenol, cresol, xylenol, nitrophenol, ethylphenol, hydroxydiphenyl, butylphenol, isopropylphenol, nonylphenol, octylphenol, methyl hydroxybenzoate and the like; lactams such as ε-caprolactam, δ-valerolactam, γ-butyrolactam, β-propiolactam and the like; aliphatic alcohols such as methanol, ethanol, propyl alcohol, butyl alcohol, amyl alcohol, lauryl alcohol and the like; ethers such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolic acid esters such as methyl glycolate, ethyl glycolate, butyl glycolate and the like; lactic acid; lactic acid esters such as methyl lactate, ethyl lactate, butyl lactate and the like; alcohols such as methylolurea, methylolmelamine, diacetone alcohol, 2-hydroxyethyl acrylate, 2-hydroxyethyl methacrylate and the like; oximes such as formamidoxime, acetamidoxime, acetoxime, methyl ethyl ketoxime, diacetylmonooxime, benzophenoneoxime, cyclohexanone-oxime and the like; malonic acid dialkyl esters such as dimethyl malonate, diethyl malonate, diisopropyl malonate, di-n-butyl malonate, diethyl methylmalonate, benzyl methylmalonate, diphenyl malonate and the like; acetoacetic acid esters such as methyl acetoacetate, ethyl acetoacetate, isopropyl acetoacetate n-propyl acetoacetate, benzyl acetoacetate, phenyl acetoacetate and the like; active methylene such as acetylacetone; mercaptans such as butyl mercaptan, t-butyl mercaptan, hexyl mercaptan, t-dodecyl mercaptan, 2-mercaptobenzothiazole, thiophenol, methylthiophenol, ethylthiophenol and the like; acid amides such as acetanilide, acetoanisidide, acetotoluide, acrylamide, methacrylamide, acetic acid amide, stearic acid amide, benzamide and the like; imides such as succinimide, phthalimide, maleimide and the like; amines such as diphenylamine, phenylnaphthylamine, xylidine, N-phenylylidine, carbazole, aniline, naphthylamine, butylamine, dibutylamine, butylphenylamine and the like; imidazoles such as imidazole, 2-ethylimidazole and the like; pyrazoles such as 3,5-dimethylpyrazole; ureas such as urea, thiourea, ethyleneurea, ethylenethiourea, diphenylurea and the like; carbamic acid esters such as phenyl N-phenylcarbamate; imines such as ethyleneimine, propyleneimine and the like; and sulfites such as sodium disulfite, potassium disulfite and the like. Of these, blocked polyisocyanates formed with active methylene type blocking agent are particularly preferred from the viewpoint of low temperature hardenability and compatibility with polyolefin or modified polyolefin (A) and hydroxyl-containing resin (C).

When the paint compositions of the present invention are of water-based type, where necessary, water-dispersible blocked polyisocyanate can be used therein as the blocked polyisocyanate. Water dispersible blocked polyisocyanate includes, for example, one prepared by blocking isocyanate groups in a polyisocyanate compound with a blocking agent containing hydroxymonocarboxylic acid and neutralizing the carboxyl groups introduced by the hydroxymonocarboxylic acid, whereby imparting water-dispersibility; and those which are made water-dispersible by addition of, or reaction with, surfactant.

The epoxy compound is subject to no particular limitation, so long as it has at least two epoxy groups per molecule, and those known per se can be used. As examples, bisphenolic epoxy resin, novolak epoxy resin, polyethylene glycol diglycidyl ether and the like can be named.

Generally desirable content of the crosslinking agent (D) is not more than 40 wt parts, preferably 3-30 wt parts, inter alia, 5-20 wt parts, per 100 wt parts of combined solid components of the polyolefin or modified polyolefin (A) and hydroxyl-containing resin (C), in consideration of compatibility with the polyolefin or modified polyolefin (A) and hydroxyl-containing resin (C); and hardenability, adherability and water resistance of formed coating film.

The paint compositions of the present invention may further contain, where necessary, pigment (E). The content of pigment (E) can be generally within a range of 0.5-200 wt parts, in particular, 0.75-175 wt parts, inter alia, 1-150 wt parts, per 100 wt parts of combined solid components of polyolefin or modified polyolefin (A) and hydroxyl-containing resin (C), in consideration of adherability and water resistance of formed coating film.

Useful pigment (E) includes coloring pigment, extender pigment, conducting pigment and the like. Coloring pigment includes, for example, titanium dioxide, red iron oxide, aluminum paste, azo-type, phthalocyanine type and the like, and extender pigment includes, for example, talc, silica, calcium carbonate, barium sulfate, zinc flower (zinc oxide) and the like. These can be used either singly or in combination of two or more. Conducting pigment is subject to no limitation so long as it is capable of imparting electric conductivity to formed coating film. It may take any form such as granules, flakes, fibers (including whiskers) and the like. For example, carbon powder such as of conducting carbon black, graphite and the like; and metal powders such as of silver, nickel, copper, aluminum and the like. Furthermore, antimony-doped tin oxide, phosphorus-doped tin oxide, acicular titanium oxide with tin oxide/antimony-coated surface, antimony oxide, zinc antimonate, indiumtin oxide, carbon or graphite whiskers with surfaces coated with tin oxide or the like; pigment formed by surface-coating flaky mica with at least one conducting metal oxide selected from tin oxide, antimony-doped tin oxide, tin-doped indium oxide (ITO), fluorine-doped tin oxide (FTO), phosphorus-doped tin oxide and nickel oxide; and conducting pigment of titanium dioxide particles containing tin oxide and phosphorus at their surface; and the like can be named, which can be used singly or in combination of two or more.

In particular, when a paint composition of the invention is made a white paint, it is desirable to use white pigment, particularly titanium dioxide, as the pigment (E), and in consideration of design effect and chemical resistance, use of titanium dioxide of average particle size ranging from about 0.05-about 2 μm, especially 0.1-1 μm, is advantageous.

Paint compositions of the present invention may contain terpene resin, where necessary, in consideration of paint compatibility. As the terpene resin, for example, terpene, terpene-phenol, hydrogenation product of aromatic modified terpene resin and the like can be named. It is desirable for the terpene resin to have a melting point within a range of 30-120° C., in particular, 40-100° C. The melting point of terpene resin can be measured by the method similar to that used with the polyolefin or modified polyolefin (A) as earlier described. Where such a terpene resin is blended, it is normally desirable to use it within a range not higher than 30 wt %, in particular, 5-20 wt %, based on the combined solid components of the polyolefin or modified polyolefin (A), hydroxyl-containing resin (C) and crosslinking agent (D).

The paint compositions of the present invention can further suitably contain, where necessary, such paint additives as hardening catalyst, rheology controlling agent, defoaming agent, organic solvent and the like.

Methods of Application

Paint compositions of the invention are applied onto objects to whose surface electric conductivity is to be imparted. While the objects are subject to no particular limitation, plastic shaped articles are particularly convenient for imparting electric conductivity.

As plastic shaped articles, for example, outer panels of cars such as bumpers, spoilers, grilles, fenders and the like, and plastic articles used as outer panels of household electric appliances can be named. As construction materials of the articles, for example, polyolefins formed by (co)polymerizing one, two or more of $C_2$-$C_{10}$ olefins such as ethylene, propylene, styrene, hexene and the like are particularly convenient. Besides these, paint compositions of the present invention are also applicable to polycarbonate, ABS resin, urethane resin, polyamide and the like.

These plastic shaped articles may be suitably given a treatment or treatments such as degreasing, washing with water or the like by the means known per se., in advance of application of paint compositions of the present invention.

A paint composition of the present application can be applied to such objects to be coated, by such means as air spray, airless spray, dipping, brushing or the like, normally to its dry coating film thickness within a range of 1-30 μm, preferably 3-15 μm. After such application of the paint composition, the coated surface may be set at room temperature for 1-60 minutes or pre-heated at around 40-80° C. for 1-60 minutes, where necessary. The coated film on the surface can be hardened at about 60-about 140° C., preferably at about 70-about 120° C., for about 20-40 minutes.

The coating film formed as above is easily given a surface resistivity not higher than $1\times10^8$ Ω/□, and is adapted as an electrically conducting coating film to favorable electrostatic coating in the next step. In the present invention, "surface resistivity" measurement is conducted with a coating film applied in the manner as will provide a dry film thickness of about 20 μm which is subsequently dried at 80° C. for 10 minutes, using TREK Co.'s surface resistivity meter, "TREK MODEL 150" (unit: Ω/□).

According to the invention, coating film formed of a paint composition of the present invention can serve as a primer film and on which coloring base paint and clear paint can be applied by the order stated.

As the coloring base paint, those known per se can be used. Normally, one comprising organic solvent and/or water as the main solvent; coloring component such as coloring pigment, effect pigment, dyestuff and the like; and resin component such as main resin, crosslinking agent; is used.

As the main resin used in the coloring base paint, for example, acrylic resin, polyester resin, alkyd resin and the like, which have crosslinkable functional groups such as hydroxyl, epoxy, carboxyl, silanol and the like can be named. As the crosslinking agent, amino resin such as melamine resin, urea resin and the like; (blocked) polyisocyanate, polyepoxide, polycarboxylic acid and the like, which are reactable with those functional groups can be named.

Such coloring base paint can further suitably contain, where necessary, paint additives such as extender pigment, hardening catalyst, ultraviolet absorber, surface-treating agent, rheology-controlling agent, antioxidant, defoaming agent, wax and the like.

The coloring base paint can be applied onto said electrically conducting primer film which has been either hardened or is remaining unhardened, by electrostatic coating normally within a range of, in terms of dry film thickness, 3-50 μm, preferably 5-20 μm. The resulting coated surface may be set at room temperature for 1-60 minutes or pre-heated at about 40-about 80° C. for 1-60 minutes, where necessary. The film can be hardened by heating at about 60-about 140° C., preferably about 70-about 120° C., for about 20-40 minutes.

In particular, when a paint composition of the present invention is to form a primer film of high degree of whiteness, a pearlescent multi-layered coating film can be formed by applying onto the primer film iridescent pearlescent base paint. Furthermore, as the coloring base coating film, a multi-layered film may be formed by applying a white base paint and iridescent pearlescent base paint by the order stated.

As the clear paint, an organic solvent-based or water-based thermosetting paint formed by blending a resin component comprising main resin, crosslinking agent and the like; organic solvent or water; and where necessary, other paint additives such as ultraviolet absorber, light stabilizer, hardening catalyst, surface-treating agent, rheology-controlling agent, antioxidant, defoaming agent, wax and the like can be used. The clear paint has transparency to an extent as will allow perception of the coating film underneath, through the clear coating film formed of the clear paint.

As the main resin, for example, acrylic resin, polyester resin, alkyd resin, fluorine-containing resin, urethane resin, silicon-containing resin and the like, which have at least one crosslinkable functional group such as hydroxyl, carboxyl, silanol, epoxy and the like, can be named. In particular, hydroxyl-containing acrylic resin is preferred. As the crosslinking agent, melamine resin, urea resin, (blocked) polyisocyanate compound, epoxy compound, carboxyl-containing compound, acid anhydride, alkoxy-silane-containing compound and the like, which are reactable with said functional groups, can be named. In particular, blocked isocyanate compound is preferred.

Such a clear paint can be applied by electrostatic coating onto unhardened or hardened coloring base coating film at a rate within a range of, in terms of dry film thickness, 10-50 μm, preferably 15-45 μm; followed by setting the resulting coated surface at room temperature for 1-60 minutes or pre-heating it at about 40-about 80° C. for 1-60 minutes, where necessary; and thereafter hardening the coated surface by heating at about 80-about 120° C. for about 20-40 minutes.

Thus, plastic shaped articles on whose electrically conducting primer coat a coloring base paint coat and clear paint coat are electrostatically applied, are obtained.

EXAMPLES

Hereinafter the present invention is explained in further details, referring to working examples in which parts and percentages are by weight, unless otherwise specified.

Example 1

The following components were blended in customarily practiced manner:

| | |
|---|---|
| aqueous chlorinated polypropylene (A-1) (an aqueous dispersion of maleic acid-modified chlorinated polypropylene having a melting point of 70° C., weight-average molecular weight of about 90,000, acid value caused by the maleic acid modification of 35 mg KOH/g and chlorine content of 22%) | 30 parts as solid weight |
| acrylic emulsion having a hydroxyl value of 30 mgKOH/g | 30 parts as solid weight |
| "WS-5000" (Mitsui Takeda Chemical, a urethane dispersion) | 30 parts as solid weight |
| "X-03-101B" (Asahi Chemical Industry, Co., an active methylene adduct of polyethylene oxide-modified polyisocyanate) | 10 parts as solid weight |
| "TITANIX JR-903" (TAYCA Corporation, titanium white) | 100 parts |
| 1-ethyl-3-methylimidazolium triflate | 5 parts. |

The blend was diluted with deionized water to a solid content of 43%, to provide an electrically conducting paint composition (1).

Example 2

The following components were blended in customarily practiced manner:

| | |
|---|---|
| aqueous polypropylene/ethylene copolymer (A-2) (an aqueous dispersion of maleic acid-modified propylene/ethylene copolymer in which the copolymerization ratio of propylene/ethylene was 96/4 by weight, having a melting point of 40° C., weight-average molecular weight of about 60,000 and acid value of 40 mgKOH/g) | 30 parts as solid weight |
| water-soluble acrylic resin having a hydroxyl value of 30 mgKOH/g | 30 parts as solid weight |
| "WS-5000" | 30 parts as solid weight |
| "X-03-101B" | 10 parts as solid weight |
| "TITANIX JR-903" | 100 parts |
| 1-ethyl-3-methylimidazolium triflate | 5 parts. |

The blend was diluted with deionized water to a solid content of 40%, to provide an electrically conducting paint composition (2).

Example 3

The following components were blended in customarily practiced manner:

| | |
|---|---|
| maleic acid-modified chlorinated polypropylene (A-3) (a toluene solution of maleic acid-modified chlorinated polypropylene, having a melting point of 80° C., weight-average molecular weight of about 90,000, acid value of 10 mgKOH/g and a chlorine content of 20%) | 40 parts as solid weight |
| polyester resin having a hydroxyl value of 20 mgKOH/g | 40 parts as solid weight |
| "Cymel 325" (Nippon Cytec Industries, Co., a melamine resin) | 10 parts as solid weight |
| "TITANIX JR-903" | 100 parts |
| 1-ethyl-3-methylimidazolium bis(trifluoromethylsulfonyl)imide | 7 parts. |

The blend was diluted with toluene to a solid content of 40% to provide an electrically conducting paint composition (3).

Example 4

The following components were blended in customarily practiced manner:

| | |
|---|---|
| acryl modified chlorinated polypropylene (A-4) (a solution in toluene of chlorinated polypropylene having a melting point of 90° C., weight-average molecular weight of about 110,000, acid value of 10 mgKOH/g and a chlorine content of 18%, which was modified at a ratio of cyclohexylmethylacrylate/propylene = 5/95 and further maleic acid-modified) | 40 parts as solid weight |
| polyester resin having a hydroxyl value of 20 mgKOH/g | 40 parts as solid weight |
| "Cymel 325" | 10 parts as solid weight |
| "TITANIX JR-903" | 100 parts |
| "Ketchen Black EC600J" (Lion-Akzo K. K., an electrically conducting carbon black pigment) | 1 part |
| 1-ethyl-3-methylimidazolium bis(trifluoromethylsulfonyl)imide | 7 parts. |

The blend was diluted with toluene to a solid content of 41%, to provide an electrically conducting paint composition (4).

Example 5

The following components were blended in customarily practiced manner:

| | |
|---|---|
| aqueous polypropylene/ethylene copolymer (A-2) | 30 parts as solid weight |
| water-soluble acrylic resin having a hydroxyl value of 30 mgKOH/g | 30 parts as solid weight |
| "WS-5000" | 30 parts as solid weight |
| "X-03-101B" | 10 parts as solid weight |
| "TITANIX JR-903" | 100 parts |
| "1-ethyl-3-methylimidazolium tetrafluoroborate" | 5 parts. |

The blend was diluted with deionized water to a solid content of 40% to provide an electrically conducting paint composition (5).

Example 6

The following components were blended in customarily practiced manner:

| | |
|---|---|
| aqueous chlorinated polypropylene (A-1) | 30 parts as solid weight |
| acrylic emulsion having a hydroxyl value of 30 mgKOH/g | 30 parts as solid weight |
| "WS-5000" | 30 parts as solid weight |
| "X-03-101B" | 10 parts as solid weight |
| "DENTOL WK 500" (Otsuka Chemical Co., acicular titanium oxide with tin oxide/antimony-coated surface) | 130 parts |
| "1-ethyl-3-methylimidazolium tetrafluoroborate" | 5 parts. |

The blend was diluted with deionized water to a solid content of 43% to provide a paint composition (6).

Example 7

The following components were blended in customarily practiced manner:

| | |
|---|---|
| aqueous polypropylene/ethylene copolymer (A-5) (an aqueous dispersion of a maleic acid-modified propylene/ethylene copolymer in which the propylene/ethylene copolymerization ratio was 96/4 by weight, having a melting point of 40° C., weight-average molecular weight of about 100,000 and an acid value of 40 mgKOH/g | 100 parts as solid weight |
| "TITANIX JR-806" | 130 parts |
| 1,2-dimethylimidazolium tetrafluoroborate | 3 parts. |

The blend was diluted with deionized water to a solid content of 40% to provide an electrically conducting paint composition (7).

Example 8

The following components were blended in customarily practiced manner:

| | |
|---|---|
| Aqueous chlorinated polypropylene (A-1) | 100 parts as solid weight |
| "TITANIX JR-806" | 130 parts |
| 1,2-dimethylimidazolium tetrafluoroborate | 3 parts. |

The blend was diluted with deionized water to solid content of 40% to provide an electrically conducting paint composition (8).

Example 9

The following components were blended in customarily practiced manner:

| | |
|---|---|
| aqueous polypropylene/ethylene copolymer (A-2) | 50 parts as solid weight |
| acrylic emulsion having a hydroxyl value of 50 mgKOH/g | 50 parts as solid weight |
| "TITANIX JR-806" | 130 parts |
| "DENACOL EX 512" (Nagase Chemtech, polyethylene glycol diglycidyl ether) | 3 parts |
| 1,2-dimethylimidazolium tetrafluoroborate | 3 parts. |

The blend was diluted with deionized water to a solid content of 40% to provide an electrically conducting paint composition (9).

Comparative Example 1

The following components were blended in customarily practiced manner:

| | |
|---|---|
| Aqueous chlorinated polypropylene (A-1) | 30 parts as solid weight |
| acrylic emulsion having a hydroxyl value of 30 mgKOH/g | 30 parts as solid weight |

-continued

| | |
|---|---|
| "WS-5000" | 30 parts as solid weight |
| "X-03-101B" | 10 parts as solid weight |

"TITANIX JR-903" (TAYCA Corporation, titanium white) 100 parts.

The blend was diluted with deionized water to a solid content of 40% to provide a paint composition (10).

Comparative Example 2

The following components were blended in customarily practiced manner:

| | |
|---|---|
| chlorinated polypropylene (A-3) | 40 parts as solid weight |
| polyester resin having a hydroxyl value of 20 mgKOH/g | 40 parts as solid weight |
| "Cymel 325" | 10 parts as solid weight |
| "TITANIX JR-903" | 100 parts. |

The blend was diluted with toluene to a solid content of 35% to provide a paint composition (11).

Comparative Example 3

The following components were blended in customarily practiced manner:

| | |
|---|---|
| aqueous chlorinated polypropylene (A-1) | 30 parts as solid weight |
| acrylic emulsion having a hydroxyl value of 30 mgKOH/g | 30 parts as solid weight |
| "WS-5000" | 30 parts as solid weight |
| "X-03-101B" | 10 parts as solid weight |
| "DENTOL WK 500" (Otsuka Chemical Co., acicular titanium oxide with tin oxide/antimony-coated surface) | 130 parts. |

The blend was diluted with deionized water to a solid content of 43% to provide a paint composition (12).

Preparation of Coated Test Panels

Example 10

Onto a polypropylene sheet (greased) the paint composition (10) as prepared in the above was spray coated to a dry film thickness of about 20 μm to form a primer coat layer. Thereafter onto the yet unhardened coat layer "WBC#713T Mica Base" was electrostatically applied to a dry film thickness of about 15 μm, which turned out to be difficult of adhesion. Therefore the electrostatic coating was changed to spray coating of the same base coat paint, to a dry film thickness of about 15 μm. After pre-heating the spray-coated surface at 80° C. for 10 minutes, "K#5001T" (Kansai Paint, an acrylic-urethane two-liquid type solvent-based clear paint) was spray coated to a dry film thickness of about 30 μm, followed by drying by heating at 120° C. for 30 minutes to provide a test coated panel.

Examples 11-18 and Comparative Example 6

Repeating the operations of Example 10 except that a paint composition as identified in Table 1 was used as the primer in each run, test coated panels were prepared.

Comparative Example 4

Onto a polypropylene sheet (greased) the electrically conducting paint composition (10) as prepared in the above was spray coated to a dry film thickness of about 20 μm to form a primer coat layer. Thereafter onto the yet unhardened coat layer "WBC#713T Mica Base" was electrostatically applied to a dry film thickness of about 15 μm, which turned out to be difficult of adhesion. Therefore the electrostatic coating was changed to spray coating of the same base coat paint, to a dry film thickness of about 15 μm. After pre-heating the spray-coated surface at 80° C. for 10 minutes, "K#5001T" (Kansai Paint, an acrylic-urethane two-liquid type solvent-based clear paint) was spray coated to a dry film thickness of about 30 μm, followed by drying by heating at 120° C. for 30 minutes to provide a test coated panel.

Comparative Example 5

Above Comparative Example 4 was repeated except that a paint composition as identified in Table 1 was used as the primer to provide a test coated panel.

Test coated panels prepared as above were subjected to the following performance tests. The results are shown also in Table 1.

Performance Test Methods (*1) Surface Resistivity of Primer Coat:

Each of those paint compositions (1)-(12) was spray coated onto a polypropylene sheet (degreased) to a dry film thickness of about 20 μm, and the resulting primer coat was heated at 80° C. for 10 minutes. Surface resistivity (Ω/□) of each of the coat was measured with "MODEL 150" (TREK Co.) at 20° C.

(*2) Transfer Efficiency:

The electrostatic coating in above Examples and Comparative Examples was conducted with Microbell (bell diameter: 50 mmΦ, Lunsburg AG), under the conditions of: paint discharge rate, 200 cc/min; rotation number of the bell head, 30,000 rpm; applied voltage, to the bell head, −60kV; and distance between the bell head of the coating machine and the surface being coated, 25 cm. Transfer efficiency at perpendicular site was calculated by the following equation:

$$\text{Transfer efficiency (\%)} = \frac{\text{weight of solid component of paint adhered onto the coated surface}}{\text{weight of solid component of paint used for the coating}} \times 100$$

Where the result was 70% or higher, the transfer efficiency is evaluated as ○, and × signifies the transfer efficiency of less than 70%.

(*3) Value (L-value):

Each of those paint compositions (1)-(12) was spray coated onto a polypropylene sheet (degreased) to a dry film thickness of about 20 μm, and the resulting primer coat was heated at 80° C. for 10 minutes. Value of each of the coat was measured with "Color Computer SM-7" (SUGA Tester Co.).

Then values of those multi-layered coats of the test panels obtained in above Examples 10-18 and Comparative Examples 4-6 were measured in similar manner.

(*4) Initial Adherability:

Each of the coated surface of the test panels as obtained in above Examples 10-18 and Comparative Examples 4-6 was given linear cuts with a cutter to the depth reaching the substrate, to mark one-hundred 2 mm×2 mm squares. An adhesive cellophane tape was adhered onto the surface and then rapidly peeled off at 20° C. The number of squares on which the coating film was left intact was examined. Where there was no peeling of the coating film, initial adherability was evaluated ○, and where there was one or more squares at which the coating film was peeled off, ×.

(*5) Water Resistance:

The coated test panels as obtained in above Examples 10-18 and Comparative Examples 4-6 were immersed in 40° C. warm water for 10 days. After drying then withdrawn panels, their coated surfaces were visually evaluated: ○ indicates no occurrence of blisters, and × indicates occurrence of blisters.

TABLE 1

|  | Example 10 | Example 11 | Example 12 | Example 13 | Example 14 | Example 15 |
|---|---|---|---|---|---|---|
| Primer paint | (1) (Example 1) | (2) (Example 2) | (3) (Example 3) | (4) (Example 4) | (5) (Example 5) | (6) (Example 6) |
| Surface resistivity of primer coat ($\Omega/\square$) | $7 \times 10^7$ | $9 \times 10^7$ | $8 \times 10^7$ | $5 \times 10^6$ | $8 \times 10^7$ | $3 \times 10^6$ |
| Transfer efficiency | ○ | ○ | ○ | ○ | ○ | ○ |
| value of primer coat (L-value) | 95 | 95 | 95 | 88 | 95 | 82 |
| Value of multilayered coat surface (L-value) | 90 | 90 | 90 | 83 | 90 | 80 |
| Initial adherability | ○ | ○ | ○ | ○ | ○ | ○ |
| Water resistance | ○ | ○ | ○ | ○ | ○ | ○ |

|  | Example 16 | Example 17 | Example 18 | Comparative Example 4 | Comparative Example 5 | Comparative Example 6 |
|---|---|---|---|---|---|---|
| Primer paint | (7) (Example 7) | (8) (Example 8) | (9) (Example 9) | (10) (Comparative Example 1) | (11) (Comparative Example 2) | (12) (Comparative Example 3) |
| Surface resistivity of primer coat ($\Omega/\square$) | $3 \times 10^7$ | $5 \times 10^7$ | $5 \times 10^7$ | $3 \times 10^{11}$ | $4 \times 10^{12}$ | $9 \times 10^7$ |
| Transfer efficiency | ○ | ○ | ○ | X | X | ○ |
| value of primer coat (L-value) | 95 | 96 | 96 | 90 | 95 | 86 |
| Value of multi-layered coat surface (L-value) | 90 | 90 | 90 | 87 | 90 | 82 |
| Initial adherability | ○ | ○ | ○ | ○ | ○ | ○ |
| Water resistance | ○ | ○ | ○ | ○ | ○ | ○ |

The invention claimed is:

1. A water-based paint composition comprising a polyolefin or modified polyolefin (A) and an ionic liquid (B), said modified polyolefin being selected from the group consisting of unsaturated carboxylic acid- or acid anhydride-modified polyolefins, acryl-modified polyolefins, chlorinated polyolefins and polyolefins modified by a combination of at least two of unsaturated carboxylic acid- or acid anhydride-modification, acryl-modification and chlorination; the polyolefin or modified polyolefin (A) having a ratio of weight-average molecular weight to number-average molecular weight (Mw/Mn) within a range of 1.5-7.0; the ionic liquid (B) being a molten salt; said composition further containing a hydroxyl containing resin (C) having a hydroxyl value within a range of 5-200 mgKOH/g within a range, in terms of weight ratio of solid component of polyolefin or modified polyolefin (A)/ hydroxyl-containing resin (C), of 20/80-85/15, and a crosslinking agent (D); said composition also further containing as a vehicle component a urethane dispersion in the range of 5-50 wt % based on the combined solid contents of polyolefin or modified polyolefin (A), hydroxyl-containing resin (C) and crosslinking agent (D).

2. A paint composition as set forth in claim 1, in which the polyolefin or modified polyolefin (A) contains propylene as a polymerization unit and the weight ratio of propylene unit in the polyolefin or modified polyolefin (A) is at least 0.5.

3. A paint composition as set forth in claim 1, in which the polyolefin or modified polyolefin (A) has a melting point not higher than 120° C. and weight-average molecular weight within a range of 50,000-150,000.

4. A paint composition as set forth in claim 1, in which the polyolefin or modified polyolefin (A) has a heat of fusion within a range of 1-50 mJ/mg.

5. A paint composition as set forth in claim 1, in which the ionic liquid (B) has an onium salt structure.

6. A paint composition as set forth in claim 1, in which the ionic liquid (B) is selected from the group consisting of 1,2-dimethylimidazolium tetrafluoroborate, tetrabutylammonium bromide, hexadecyltributylphosphonium bromide, 1-butyl-3-methylimidazolium hexafluorophosphate, N-hexylpyridinium tetrafluoroborate, 1-ethyl-3-methylimidazolium tetrafluoroborate, 1-hexyl-3-methyl-imidazolium tetrafluoroborate, 1-ethyl-3-methylimidazolium bis(trifluoromethylsulfonyl)imide, 1-butyl-3-methylimidazolium bis(trifluoromethylsulfonyl)imide, 1-ethyl-3-methylimidazolium triflate, 1-ethyl-3-methylimidazolium chloride, N-butylpyridinium chloride, N,N-diethyl-N-methyl-(2-methoxyethyl)ammonium tetrafluoroborate, N,N-diethyl-N-methyl-(2-methoxyethyl)ammonium bis(trifluoromethylsulfonyl)imide, 1-ethyl-3-methylimidazolium-(L)-lactate and 1-butyl-3-methylimidazolium-(L)-lactate.

7. A paint composition as set forth in claim 1, which contains the ionic liquid (B) within a range of 0.5-30% by weight, based on non-volatile component of the paint composition.

8. A paint composition as set forth in claim 1, in which the crosslinking agent (D) is amino resin or blocked polyisocyanate.

9. A paint composition as set forth in claim 1, which further contains pigment (E).

10. A paint composition as set forth in claim 1, which is a white paint containing white pigment.

11. A coating method which comprises coating an object surface with a paint composition as set forth in claim 1.

12. A coating method as set forth in claim 11, in which the object to be coated is a plastic shaped article.

13. Coated articles coated with the paint composition as set forth in claim 1.

* * * * *